(12) United States Patent
Li et al.

(10) Patent No.: US 8,526,333 B2
(45) Date of Patent: Sep. 3, 2013

(54) METHOD FOR DETECTING NETWORK ASYMMETRICAL STATUS AND ASYMMETRICAL COMMUNICATION CHANNELS FOR POWER SYSTEM

(75) Inventors: Youyi Li, Beijing (CN); Bin Su, Beijing (CN)

(73) Assignee: ABB Research Ltd., Zurich (CH)

( * ) Notice: Subject to any disclaimer, the term of this patent is extended or adjusted under 35 U.S.C. 154(b) by 135 days.

(21) Appl. No.: 13/147,693

(22) PCT Filed: Feb. 9, 2009

(86) PCT No.: PCT/CN2009/000137
§ 371 (c)(1),
(2), (4) Date: Aug. 3, 2011

(87) PCT Pub. No.: WO2010/088788
PCT Pub. Date: Aug. 12, 2010

(65) Prior Publication Data
US 2011/0286361 A1    Nov. 24, 2011

(51) Int. Cl.
*H04L 12/28* (2006.01)

(52) U.S. Cl.
USPC ............................................. 370/255

(58) Field of Classification Search
USPC ........................ 370/254, 255, 258
See application file for complete search history.

(56) References Cited

U.S. PATENT DOCUMENTS
6,538,451 B1    3/2003    Galli et al.

FOREIGN PATENT DOCUMENTS
| CN | 1758628 A | 4/2006 |
| CN | 1791004 A | 6/2006 |
| WO | WO0124482 A1 | 4/2001 |

OTHER PUBLICATIONS
ISA/CN, International Search Report re Application No. PCT/CN2009/000137, Oct. 1, 2009.

*Primary Examiner* — Dang Ton
*Assistant Examiner* — Kevin Lee
(74) *Attorney, Agent, or Firm* — Anthony M. Del Zoppo, III; Driggs, Hogg, Daugherty, Del Zoppo Co., LPA

(57) ABSTRACT

The present invention provides a new synchronization method named Multi-Node Echo Method (MNEM), which settles the problem of clock/data synchronization with asymmetrical channels. In MNEM, the echo messages are relayed among multi-node loop both by clockwise and anti-clockwise. Based on Multi-Node Echo Method, the invention further provides a method to detect symmetrical status of a communication network, a method to detect asymmetrical status of any channel in a communication network, and a method to calculate the sending and receiving delay values of any channel in a communication network, even when the channel is asymmetrical.

6 Claims, 4 Drawing Sheets

METHOD FOR DETECTING NETWORK ASYMMETRICAL STATUS AND ASYMMETRICAL COMMUNICATION CHANNELS FOR POWER SYSTEM

RELATED APPLICATION

This application is a national filing of PCT application Serial No. PCT/CN2009/000137, filed Feb. 9, 2009.

FIELD OF THE INVENTION

This invention relates to the field of power system, and more particularly to a Multi-Node Echo Method for detecting asymmetrical status of a power system, and further for detecting a communication channel's symmetrical or asymmetrical status. This invention can also calculate the delay of communication channel in some conditions.

BACKGROUND OF THE INVENTION

Along with the development and improvement of modern power communication network, self-healing ring network (SDH) routing is gradually increasing, which causes new problem to optical fibre current differential protection for transmission lines.

Existing widely-used data synchronization technique for current differential protection is echo method (ping-pong method) which assumes that the sending and receiving delays are the same. Thus, once the communication routing changes, the delays of sending and receiving channels may be no longer equal. As a result, the correlative clocks in different substations are no more synchronized, neither are the corresponding data. It will severely affect the reliability of protection system and even lead to mal-tripping in some cases. Thus, clock synchronization or data synchronization with asymmetrical channels is very important to the applications in power system, especially to current differential protection.

JP2004226243A provides a solution for clock/data synchronization using GPS, which will not be influenced by asymmetrical channels. GPS can provide accurate, absolute and synchronized time for all substations in theory. But the GPS signal and GPS device are still not reliable enough for protection applications at present. As a result, GPS have not been widely used by current differential protections for synchronization currently.

SUMMARY OF THE INVENTION

To overcome the shortcomings of present synchronization methods, a new synchronization method named Multi-Node Echo Method (MNEM) is provided in this invention, which can detect asymmetrical status of network, detect asymmetrical status of a channel, and further calculate the channel delays. Thus the present invention settles the problem of detecting asymmetrical status and/or channels of network and clock/data synchronization with asymmetrical channels. It is more reliable and practical using method of the present invention than using GPS. In MNEM, the echo messages are relayed among multi-node loop both by clockwise and anti-clockwise. The channel in the present invention means communication channel.

According to one aspect of the present invention there is provided a method for detecting asymmetrical status of network with at least three nodes, comprising the steps of:
1) Select a set of echo loops which can cover all the existing channels in the network;
2) Employ the multi-node echo method for each echo loop;
3) Detect and compare each echo loop's clockwise delay and anti-clockwise delay. If each pair of the clockwise delay and anti-clockwise are equal, it means all the loops are symmetrical, thus, the whole network is in symmetrical status. Otherwise, if any pair of delays is not equal, it means at least one channel is asymmetrical; hence the network is in asymmetrical status.

If it is a two-node network, one or more additional nodes can be added to employ multi-node echo method.

In accordance with another aspect of the present invention there is provided an alternative way of indicating the existence of asymmetrical status of a channel in network with at least four nodes. The method comprises the following steps:
1) Select two multi-node echo loops which both include the channel to be tested;
2) Employ the multi-node echo method for the two echo loops;
3) Detect the symmetrical status of each echo loop by comparing each loop's clockwise delay and anti-clockwise delay. If both loops are asymmetrical, their common channel is asymmetrical. Otherwise, their common channel is symmetrical.

If the network only contains three nodes, one or more additional nodes can be added to employ multi-node echo method.

In accordance with another aspect of the invention there is provided a method for calculating the channel delays. The method comprises the following steps:
1) Find out whether the channel is symmetrical or asymmetrical using above method;
2) If the channel is symmetrical, calculate the delay with the following steps:
    a) Compute the sum of the sending and receiving delays of the channel by traditional echo method; the result is denoted by $t_{sum}$;
    b) Because the sending delay is equal to receiving delay of the channel, each of them is the half value of $t_{sum}$;
3) If the channel is asymmetrical, calculate the delay by MNEM with the following steps:
    a) Compute the sum of the sending and receiving delays of the asymmetrical channel by traditional echo method; the result is denoted by $t_{sum}$;
    b) Detect the difference of the sending and receiving delays of the asymmetrical channel by MNEM, the result is denoted by $\Delta t$, $\Delta t$ is the value of subtracting the whole loop delay which including the sending delay of the asymmetrical channel from the whole loop delay which including the receiving delay of the asymmetrical channel;
    c) The sending delay of the asymmetrical channel is the half value of the sum of $t_{sum}$ and $\Delta t$.
    d) The receiving delay of the asymmetrical channel is the half value of the difference of $t_{sum}$ and $\Delta t$.

BRIEF DESCRIPTION OF THE DRAWINGS

The subject matter of the invention will be explained in more details in the following description with reference to preferred exemplary embodiments which are illustrated in the drawings, in which:

FIG. 1A to 1B shows traditional Echo Method for clock synchronization; in which, FIG. 1A shows a 2-node transmission line with communication channel, FIG. 1B shows channel delay of echo message;

FIG. 2A to 2C is multi-node echo method used in three nodes system; in which, FIG. 2A shows 3-node transmission lines with communication channels, FIG. 2B shows 3-node echo method loops, FIG. 2C shows channel delay of echo message;

FIG. 3A to 3D is multi-node echo method used in four nodes system; in which, FIG. 3A shows 4-node transmission lines with communication channels, FIG. 3B shows 4-node echo method loops, FIG. 3C shows one pair of 3-node echo method loops, FIG. 3D shows another pair of 3-node echo method loops;

FIG. 4A to 4C shows multi-node echo method according to 4-node embodiment of the invention; in which, FIG. 4A shows 4-node network structure, FIG. 4B shows MNEM loops for channel 2-4, FIG. 4C shows MNEM loops for channel 2-3.

DETAILED DESCRIPTION OF PREFERRED EMBODIMENTS

Multi-Node Echo Method (MNEM) is different from traditional echo method (EM) both in process and situation.

The traditional echo method (EM) that is widely used in power system currently is illustrated below for reference.

TABLE 1

Comparison between MNEM and EM

|  | Process | Suitable scope |
|---|---|---|
| EM | Echo message is transmitted only between two nodes | Only symmetrical channels |
| MNEM | Echo message is transmitted among multi-node (≧3) loops. | Both symmetrical and asymmetrical channels |

Figure 1A:
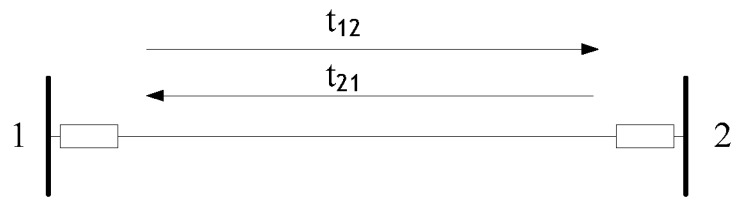
Figure 1B:
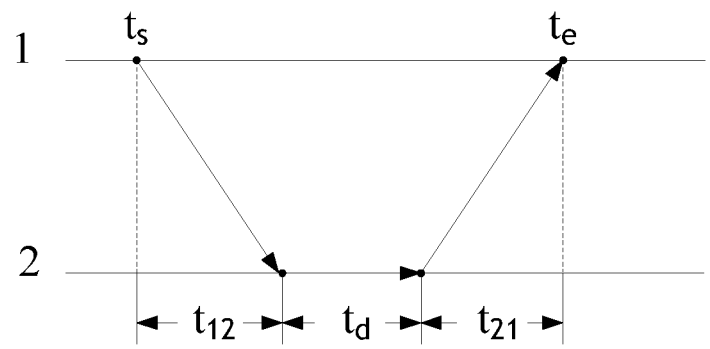

FIG. 1 shows the principle of traditional echo method. The key point of traditional echo method is to calculate the sending and receiving delays of communication channel between two substations. As is shown in FIG. 1, an echo message is sent from substation-one 1 to substation-two 2 at the time $t_s$, substation-two 2 receives this message and sends it back to substation-one 1 after a delay of $t_d$ that will be added into the message. Finally, substation-one 1 receives the message (includes the values of $t_s$, $t_e$, and $t_d$) at the time $t_e$. The delay of the channel t can be calculated (suppose the sending and receiving channel are symmetrical, $t_{12}=t_{21}$).

$$t=t_{12}=t_{21}=(t_e-t_s-t_d)/2 \quad (1)$$

That the sending and receiving channels are symmetrical is prerequisite for the traditional echo method, which may be influenced by communication route variation. The echo method will be invalid without the prerequisite. It means, if $t_{12} \neq t_{21}$, the equation (1) will not hold.

Multi-Node Echo Method

A new concept of Multi-Node Echo Method (MNEM) is proposed in this invention to resolve the problems. In MNEM, the echo messages are relayed among multi-node loops both clockwise and anti-clockwise. MNEM will bring more useful information about the delays of channels than traditional echo method.

How to detect the symmetrical status of a three-node power system in use of MNEM is discussed below as an embodiment.

Figure 2A:
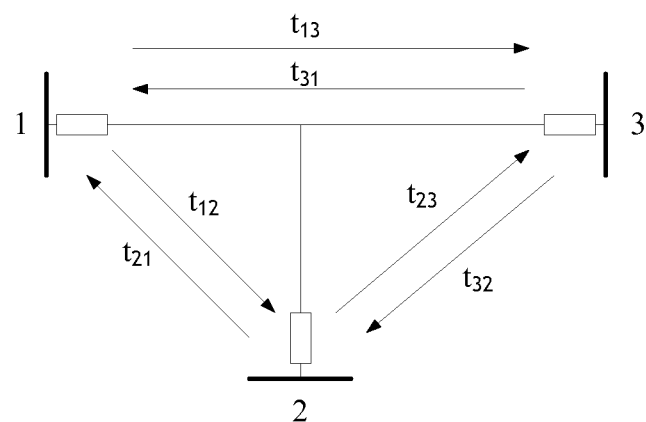
Figure 2B:
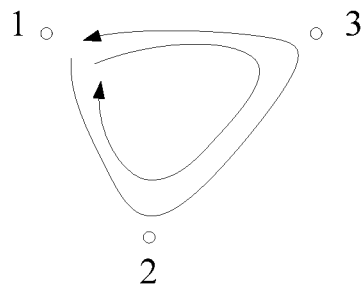
Figure 2C:
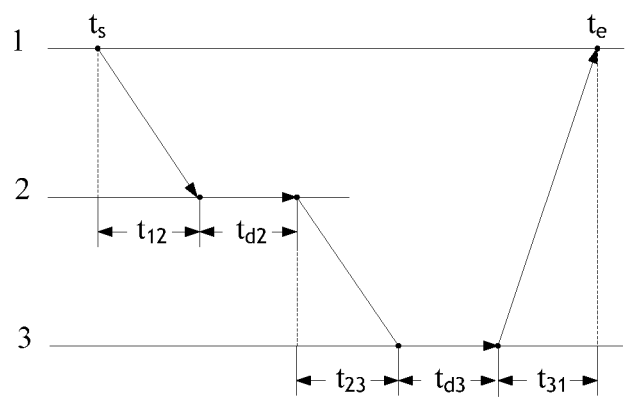

FIG. 2A shows a three-node (terminal) transmission line system. MNEM is employed in this network. The echo message can be relayed along different loops. FIG. 2B shows a clockwise loop (1→3→2→1) and an anti-clockwise loop (1→2→3→1). Take the anti-clockwise loop of 1→2→3→1 for example, its details are shown in FIG. 2C.

An echo message is sent from station-one 1 to substation-two 2 at time $t_s$. Then, substation-two 2 receives the message and sends it to substation-three 3 after a delay of $t_{d2}$. Substation-three 3 receives the message after a network delay of $t_{23}$, and sends it back to substation-one 1 after a delay of $t_{d3}$. Substation-one 1 receives the message finally at time $t_e$, then the total delay of this echo loop (1→2→3→1) can be calculated by substation-one 1 as is shown below.

$$t_{12}+t_{23}+t_{31}=C_1=t_e-t_s-t_{d2}-t_{d3} \quad (2)$$

Here $t_e$, $t_s$, $t_{d2}$, $t_{d3}$ can be got from the MNEM, they are all known values when substation-one 1 finally receives the echo message. And then the total delay of anti-clockwise loop $C_1$ can be calculated. The total delay of clockwise loop (1→3→2→1) can also be calculated by the same method below.

$$t_{13}+t_{32}+t_{21}=C_2 \quad (3)$$

Here $C_2$ can be calculated by using MNEM.

The equations of (2) and (3) are the base of MNEM, which provide the original data for subsequent steps of MNEM as exemplified further below.

MNEM will be used in a 3-node network and a 4-node network to illustrate the following method:

1) How to detect symmetrical status of a communication network. If one or more channels become asymmetrical in the network, MNEM can detect the asymmetrical status which can give channel error alarm for current differential protection and avoid mal-tripping. This method can be employed by any network with at least three nodes.

2) How to detect asymmetrical status of any channel in a communication network. It can further point out the channel in asymmetrical status. It will bring much convenience for channel maintenance and repair. This method can be employed by any network with at least four nodes 3) How to calculate the sending and receiving delay values of any channel in a communication network, even when the channel is asymmetrical. It can be used for time compensation (data synchronization). Current differential protection can work well even when the channel is in asymmetrical status in this way. This method can be employed by any network with at least four nodes.

Method One—Detect Asymmetrical Status of Network

As is shown in FIG. 2, there are two echo loops in three-node network. One is clockwise loop and the other is anti-clockwise loop. The corresponding total delays for the echo loops are shown below.

$$t_{12}+t_{23}+t_{31}=C_1 \quad (4)$$

$$t_{13}+t_{32}+t_{21}=C_2 \quad (5)$$

Here, $C_1$ and $C_2$ can be got by MNEM. If all the channels in this 3-node network are symmetrical, that is $$\begin{cases} t_{12} = t_{21} \\ t_{23} = t_{32} \\ t_{31} = t_{13} \end{cases} \quad (6)$$

As a result, the total delays of clockwise and anti-clockwise loops are equal ($C_1=C_2$). In power system, if the error between $C_1$ and $C_2$ is less than 0.1 ms, $C_1$ will be considered equal to $C_2$. This error margin may vary according to different power system and different devices.

On the other hand, if $C_1 \neq C_2$, it means equation (6) will no longer hold. In other words, $C_1 \neq C_2$ means at least one of the channels in this network is asymmetrical.

Therefore, asymmetrical status of network can be detected by comparing the total delays of clockwise and anti-clockwise loops. If the delays are equal, it means the network is in symmetrical status. Otherwise, it means at least one channel is asymmetrical; hence the network is in asymmetrical status.

This method can be employed for any multi-node network (node number $\geq 3$). And a 4-node network case is illustrated below.

Figure 3A:
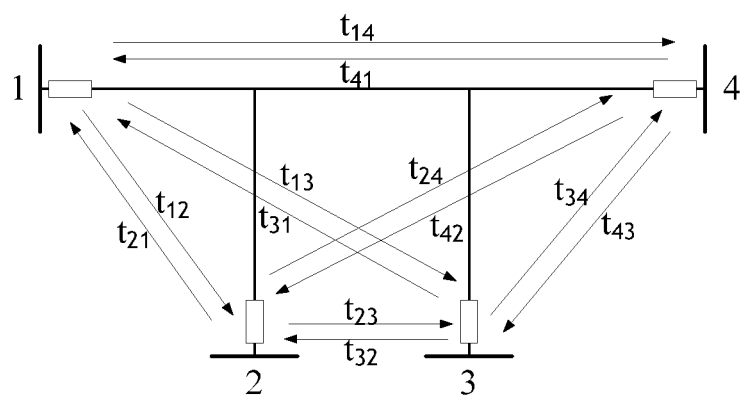

FIG. 3A shows a 4-node transmission line system with 6 communication channels. MNEM can be employed in this network to detect the symmetrical status.

Figure 3B:
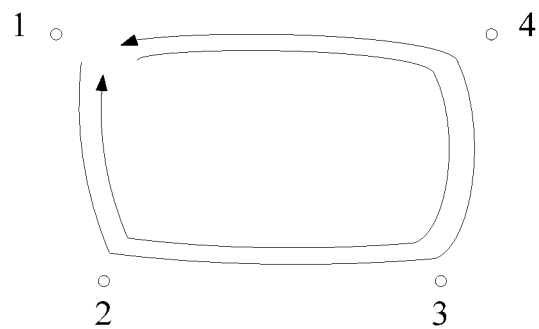
Figure 3C:
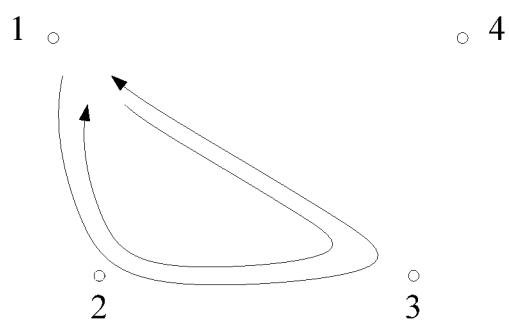
Figure 3D:
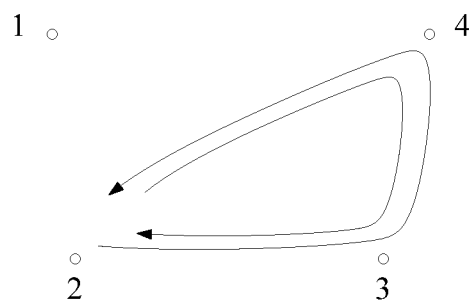

There are lots of choices for the echo loops. The key point is that the set of loops should cover all the communication channels in the network. For the network in FIG. 3A, one available choice of loops is shown in FIG. 3B~FIG. 3D. FIG. 3C~FIG. 3D are 3-node echo methods which have been discussed before. FIG. 3B is a 4-node echo method which is similar to 3-node one. The corresponding total delays for the echo loops are shown below.

$$t_{12}+t_{23}+t_{34}+t_{41}=C_1 \quad (7)$$

$$t_{14}+t_{43}+t_{32}+t_{21}=C_2 \quad (8)$$

Like the method used in a 3-node network, in 4-node network, if the total delays of clockwise and anti-clockwise loops are equal ($C_1=C_2$, here, if the error between $C_1$ and $C_2$ is less than 0.1 ms, $C_1$ will be considered equal to $C_2$), it means the network is in symmetrical status. If it is not equal ($C_1 \neq C_2$), it means at least one channel is asymmetrical; hence the network is in asymmetrical status.

In conclusion, for any multi-node network which contains at least 3 nodes, the asymmetrical status of the network can be detected by the following steps:

1) Select a set of echo loops which can cover all the existing communication channels in the network.

2) Employ the multi-node echo method for each echo loop.

3) Detect and compare each echo loop's clockwise delay and anti-clockwise delay.

If each pair of the clockwise and anti-clockwise delays is equal, it means all the loops are symmetrical, thus, the whole network is in symmetrical status. Otherwise, if any pair of delays is not equal, it means at least one channel is asymmetrical; hence the network is in asymmetrical status.

If it is a two-node network, one or more additional nodes can be added, and then the MNEM can also be employed.

If the network is detected to be in asymmetrical status, the differential protection can be disabled.

Method Two—Detect Asymmetrical Status of any Channel in Network

MNEM can further detect the asymmetrical channel based on method one. It will bring much convenience for channel maintenance and repair. This method can be employed by any network with at least four nodes.

This method is based on the assumption that there is no more than one channel asymmetrical at the same time in the restricted network (the part of the whole network includes at least two loops and the two loops have one common channel). The restricted network is always a small network and the probability that a channel becomes asymmetrical is very low. Thus, there is no need to consider the case that more than one asymmetrical channels exist at the same time in a small network.

If two loops in a network are detected both in asymmetrical status and they have one common channel, the common channel is asymmetrical. A typical case is shown below as a preferred embodiment.

Figure 4A:
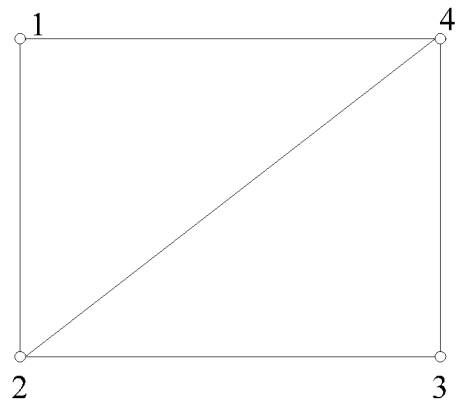

As is shown in FIG. 4A, it's a 4-node network with 5 channels. The MNEM for channel 2-4 is shown in FIG. 4B and that for channel 2-3 is shown in FIG. 4C.

Figure 4B:
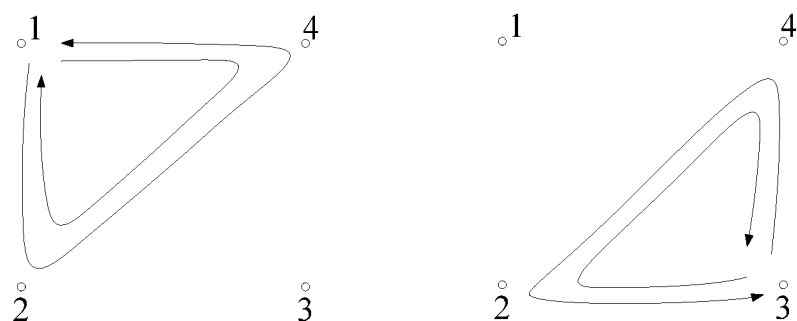
Figure 4C:
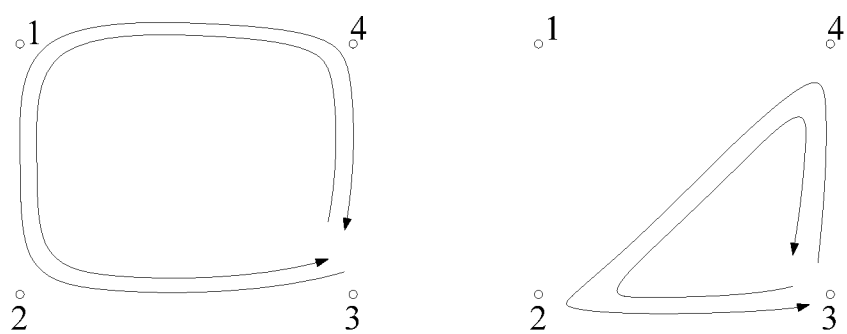

As is shown in FIG. 4B, loop 1-2-4 (from substation-one 1 via substation-two 2 to substation-four 4 and back to substation-one 1) and 2-3-4 have the common channel 2-4 and MNEM is employed in the two loops. If both loops are asymmetrical, it can be concluded that their common channel 2-4 is asymmetrical. Otherwise, if both loops are symmetrical or one loop is symmetrical and the other one is asymmetrical, it can be concluded that the common channel is symmetrical. The four possible results of the MNEM in FIG. 4B are shown below.

$$\begin{cases} t_{12}+t_{24}+t_{41} \neq t_{21}+t_{42}+t_{13} \\ t_{23}+t_{34}+t_{42} \neq t_{32}+t_{43}+t_{24} \end{cases} \Rightarrow \text{Channel 2-4 is asymmetrical} \quad (9)$$

$$\begin{cases} t_{12}+t_{24}+t_{41} = t_{21}+t_{42}+t_{13} \\ t_{23}+t_{34}+t_{42} = t_{32}+t_{43}+t_{24} \end{cases} \Rightarrow \text{Channel 2-4 is symmetrical} \quad (10)$$

$$\begin{cases} t_{12}+t_{24}+t_{41} = t_{21}+t_{42}+t_{13} \\ t_{23}+t_{34}+t_{42} \neq t_{32}+t_{43}+t_{24} \end{cases} \Rightarrow \text{Channel 2-4 is symmetrical} \quad (11)$$

$$\begin{cases} t_{12}+t_{24}+t_{41} \neq t_{21}+t_{42}+t_{13} \\ t_{23}+t_{34}+t_{42} = t_{32}+t_{43}+t_{24} \end{cases} \Rightarrow \text{Channel 2-4 is symmetrical} \quad (12)$$

It is easy to prove the conclusion. Based on the power system's real conditions, the communication channels are symmetrical in most conditions. It is a small probability that one communication channel becomes asymmetrical. Thus, the present invention is base on the precondition that there will be only one asymmetrical channel at the same time. If both loops are asymmetrical, and their common channel 2-4 is symmetrical, one can deduce that there are at least two asymmetrical channels in the whole system. This contradicts with the precondition.

Furthermore, if there is a loop symmetrical, the common channel must be symmetrical. Otherwise both the two loops are asymmetrical.

There may be more loop choices, because there may be more than two loops with the same common channel.

In conclusion, for any multi-node network with at least four nodes, method two can be achieved by the following steps.

1) For any certain channel to be tested in the network, select two multi-node echo loops which both include the channel to be tested (this channel is the common channel).

2) Employ the MNEM for the two echo loops.

3) Detect the symmetrical status of each echo loop by comparing each loop's clockwise delay and anti-clockwise delay. If both loops are asymmetrical, their common channel is asymmetrical. Otherwise, their common channel is symmetrical.

It's obvious that there must be at least two multi-node loops with the same common channel for method two of MNEM. Hence method two is only suitable for the network which has at least four nodes. For the network that has less than four nodes, additional nodes can be added and then method two can be implemented.

Method Three—Calculate the Channel Delays

MNEM can be employed to calculate the channel delays accurately by any multi-node network ($\geq 4$ nodes), even when the channel is asymmetrical. It can be used for time compensation (clock/data synchronization). With method three, current differential protection can work well even when the channel is in asymmetrical status.

Method three is based on method two. After the asymmetrical channel is detected by method two, the time difference of the sending and receiving delays of this channel can be calculated. At the same time, traditional echo method can also be employed in this channel to get the sum of sending and receiving. These data can form an equation group, and then, sending and receiving delays can be calculated finally.

For example, in FIG. 4B, it is assumed that the channel 2-4 is detected to be asymmetrical by method two and other channels are all symmetrical. It means, $$\begin{cases} t_{24} \neq t_{42} \\ t_{12} = t_{21} \\ t_{14} = t_{41} \\ t_{23} = t_{32} \\ t_{34} = t_{43} \end{cases} \quad (13)$$

The total delays of anti-clockwise loop (1→2→4→1) and clockwise loop (1→4→2→1) can be got by MNEM. They are $(t_{12}+t_{24}+t_{41})$ and $(t_{21}+t_{42}+t_{14})$. Then, the time difference of the sending and receiving delays of channel 2-4 ($\Delta t$) can be calculated below:

$$\Delta t = (t_{12}+t_{24}+t_{41}) - (t_{21}+t_{42}+t_{14}) = t_{24}-t_{42} \quad (14)$$

Then, traditional echo method is employed in channel 2-4 and the sum of sending and receiving delay $t_{sum}$ is got below:

$$t_{sum} = t_{24}+t_{42} \quad (15)$$

The sending and receiving delays of this channel can be calculated below:

$$\begin{cases} \Delta t = t_{24} - t_{42} \\ t_{sum} = t_{24} + t_{42} \end{cases} \Rightarrow \begin{cases} t_{24} = (t_{sum} + \Delta t)/2 \\ t_{42} = (t_{sum} - \Delta t)/2 \end{cases} \quad (16)$$

In conclusion, for any multi-node network (node number $N \geq 4$), method three can be achieved by following steps.

1) Find the asymmetrical channel by method two of MNEM.

2) If the channel is symmetrical, calculate the delay with equation (1).

3) If the channel is asymmetrical, calculate the delay by MNEM with equation (14)~(16).

It's obvious that there must be at least two multi-node loops with the same common channel for method three of MNEM. Hence method three is only suitable for the network with at least four nodes. For the network with less than four nodes, additional nodes can be added and then method three can be implemented.

Though the present invention has been described on the basis of some preferred embodiments, those skilled in the art should appreciate that those embodiments should by no means limit the scope of the present invention. Without departing from the spirit and concept of the present invention, any variations and modifications to the embodiments should be within the apprehension of those with ordinary knowledge and skills in the art, and therefore fall in the scope of the present invention which is defined by the accompanied claims.

The invention claimed is:

1. A method for detecting an asymmetrical status of a communication network with at least three nodes for a power system, comprising:
    selecting a set of echo loops, wherein the set of echo loops is selected by covering all the existing communication channels in the network;
    employing a multi-node echo approach for each echo loop in the set of the echo loops by transmitting echo messages in both clockwise and anti-clockwise direction through the echo loops;
    detecting and comparing each echo loop's clockwise delay and anti-clockwise delay;
wherein if each pair of the clockwise delay and the anti-clockwise delay are equal, the whole network is in symmetrical status; otherwise, the network is in asymmetrical status.

2. The method of claim 1, further comprising:
    adding, prior to steps of selecting, employing and detecting, an additional node if the network only contains two nodes.

3. The method of claim 1, further comprising:
    disabling differential protection in response to the network being in asymmetrical status.

4. A method for detecting an asymmetrical status of a channel in a communication network with at least three nodes for a power system, comprising:
    selecting two multi-node echo loops, both including the channel;
    employing a multi-node echo approach for each of the two multi-node echo loops by transmitting echo messages in both clockwise and anti-clockwise direction through the two multi-node echo loops;
    detecting and comparing each of the two multi-node echo loop's clockwise delay and anti-clockwise delay; wherein if both pairs of the clockwise delay and the anti-clockwise delay are unequal, a common channel of the two multi-node echo loops is asymmetrical; otherwise, the common channel of the two multi-node echo loops is symmetrical.

5. The method of claim 4, further comprising:
    adding, prior to steps of selecting, employing and detecting, an additional node if the network only contains three nodes.

6. The method of claim 4, wherein the selected multi-node loops are 3-node loops.

* * * * *